Aug. 24, 1948.  N. A. DYSART  2,447,689
PRESSURE INDICATOR FOR PNEUMATIC TIRES
Filed July 20, 1946
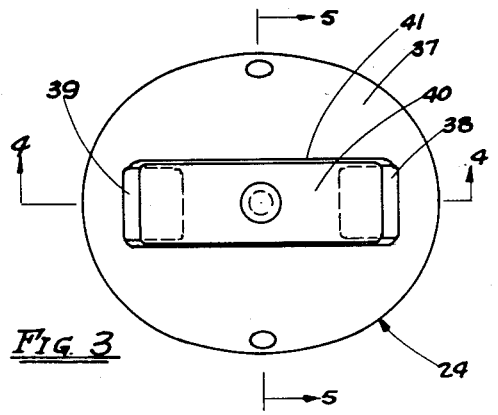
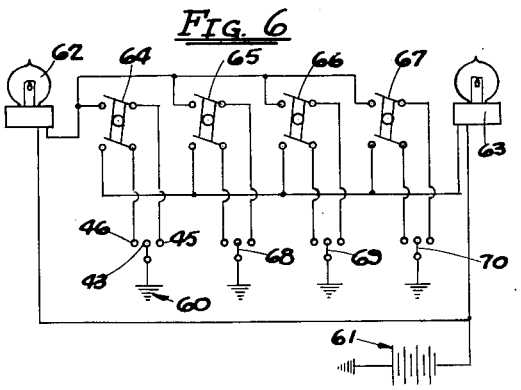
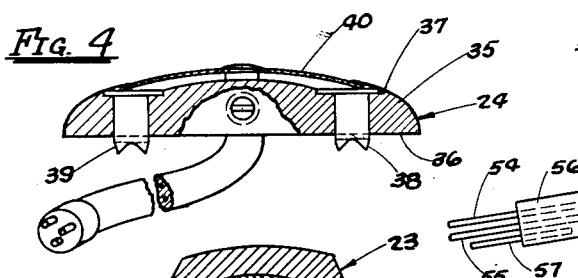
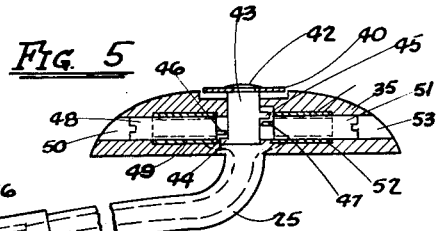
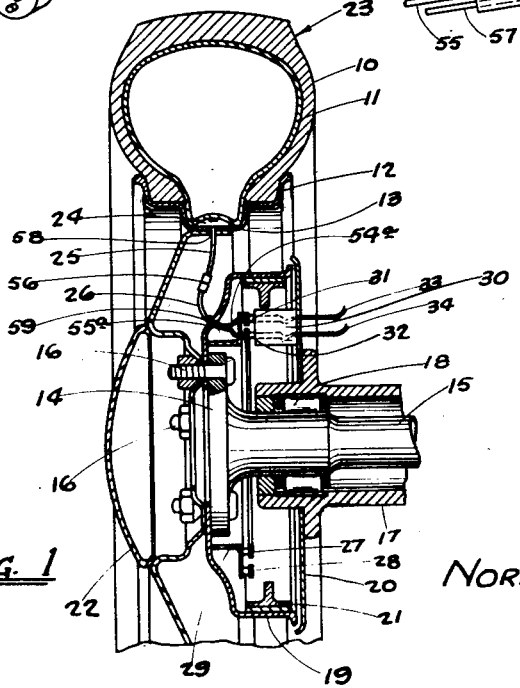
Norman A. Dysart, Inventor Patented Aug. 24, 1948

2,447,689

UNITED STATES PATENT OFFICE 2,447,689

PRESSURE INDICATOR FOR PNEUMATIC TIRES

Norman A. Dysart, Riverside, Calif., assignor of thirty-seven and one-half per cent to Grady L. Fox and thirty-seven and one-half per cent to Charles F. Smith, both of Amarillo, Tex.

Application July 20, 1946, Serial No. 685,020

14 Claims. (Cl. 200—58)

1

This invention relates to apparatus for indicating pressure within a pneumatic tire and is particularly directed to a novel form of electric switch element adapted to be inserted between the wheel rim and the inner tube within the pneumatic tire.

A broad object of this invention is to provide means for indicating to the operator of a wheeled vehicle, such as an automobile, truck, bus, tractor or airplane, the unit pressure existing in each of the pneumatic tires of the vehicle. The indicator may be of any preferred visual or audible type operated electrically and located in or near to the operator's compartment. As an illustration, the unit pressure of each of the tires may be indicated by means of colored lights on the dashboard or control panel of the vehicle. By this means the operator may be apprized of under-inflation or over-inflation of any tire and he may accordingly take immediate steps to remedy the undesirable condition.

More specifically, it is the principal object of this invention to provide an improved form of electric switch unit adapted to be actuated by pneumatic pressure. Another object is to provide a novel form of switch unit adapted for use with wheel rims, inner tubes and tire casings of standard conventional construction. Another object is to provide a device of this type adapted to close one electric circuit in response to high pressure and adapted to close another electric circuit in response to low pressure within the inner tube. A further object is to provide such an electric switch unit having readily adjustable contact elements for independently regulating the upper and lower limits of the pressure range of the unit. Another object is to provide such a switch unit in which the contact elements may be adjusted without removing the tire from the wheel rim. Other objects and advantages will appear hereinafter.

In the drawings:

Figure 1 is a partial transverse sectional view showing a pneumatic tire and tube mounted on a wheel rim, and illustrating a preferred embodiment of my invention.

Figure 2 is a sectional view similar to Figure 1 showing a modified form of the invention.

Figure 3 is a top plan view on an enlarged scale of the switch unit shown in Figure 1.

Figure 4 is a sectional view taken substantially on the lines 4—4 as shown in Figure 3.

Figure 5 is a sectional view taken substantially on the lines 5—5 as shown in Figure 3.

Figure 6 is a wiring diagram diagrammatically illustrating the electric circuits for operation of the signal devices from switches mounted on the various wheels of the vehicle.

Referring to the drawings, the pneumatic tire casing 10 in Figure 1 is provided with the usual

2 inner tube 11 and both are mounted on a conventional wheel rim 12. The rim 12 may be of the drop-center type in which a central annular portion 13 is of smaller diameter than the tire-contacting portions of the rim. The wheel rim 12 may be rotatably supported in any conventional manner and, as shown in the drawings, this means includes a flange 14 on an axle 15 and a series of bolt and nut fasteners 16. The axle 15 may be rotatably mounted in the stationary housing 17 by means of a wheel bearing 18. The usual brake drum 19 may be secured to the wheel flange 14 and a non-rotatable guard flange 20 may be provided for the brake bands 21. The usual hub cap 22 may be provided, if desired.

In accordance with my invention, means are provided for operation of a signal device in accordance with pressure variations within the pneumatic tire and tube assembly generally designated 23. This means comprises a pressure operated switch 24 which is connected by insulated cables 25 and 26 to a pair of contact rings 27 and 28 which are positioned concentrically on insulated spacers within the brake drum 19. A supporting ring 29 fixed to the brake drum 19 by any convenient means maintains the contact rings 27 and 28 in concentric relation with respect to the axle 15. A block 30 having a pair of spring urged contact shoes 31 and 32 is mounted on the stationary flange 20 in a position so that the shoe 31 rides on the outer ring 28 and the shoe 32 rides on the inner ring 27. The insulated electrical leads 33 and 34 are connected with the shoes 31 and 32, respectively, and are connected to the signal means on the dashboard of the vehicle.

The switch element 24 comprises an oval-shaped body 35 formed of insulating material, such as fiber, rubber, plastic, etc. The lower surface 36 of the body 35 is flat and the upper surface 37 is rounded so as to avoid obstructions or sharp edges. A pair of metallic elements 38 and 39 are symmetrically mounted on the body 35 and extend downwardly through the lower surface 36. Each of the elements 38 and 39 is provided with a serrated surface for contact with the metallic wheel rim 12. The upper portion of each of the elements 38 and 39 is adapted for sliding contact with one end of a curved resilient actuator 40. The actuator 40 is formed of a metallic strip and operates within a recess 41 provided in the upper curved surface 37 of the switch unit 24. The actuator 40 is connected as by riveting 42 to a central movable switch member 43 mounted between the elements 38 and 39 for limited reciprocating movement within the body 35. A pair of lateral contact ears 44 and 45 are fixed on the movable member 43 and each is adapted to contact corresponding projections 46, 47. These projections act to limit the extent of movement of the member 43 in both directions.

The projection 46 is eccentrically mounted on the inner end of a metallic adjusting screw 48 threaded onto a metallic sleeve 49 mounted in the body 35. An access opening 50 is provided for turning the screw 48 and thereby changing the relative position of the projection 46. Similarly, the projection 47 is mounted eccentrically on the inner end of the metallic screw 51 which is threaded onto the metallic sleeve 52, and an access opening 53 is provided for turning the screw 51.

The resilience of the actuator 40 applies an upward force on the member 43, and, from the above description, it will be understood that the position of the screw 48 determines the uppermost limit of travel. Similarly, the downward movement of the member 43 is limited by the angular position of the screw 51. The upper and lower range of movement may be changed by suitable adjustment of the screws 48 and 51. The electrical lead 54 is attached to the metallic sleeve 49 and another electrical lead 55 is attached to the metallic sleeve 52. The two leads 54 and 55 are encased within the common insulated cable 25. A disconnect fitting 56 joins the cables 25 and 26 and permits easy separation of the cables 25 and 26 when the wheel rim 12 is removed from the wheel flange 14. A third prong 57 is provided in the disconnect fitting 56 to insure proper connections of the corresponding leads without possibility of cross-over. The corresponding electrical leads 54ª and 55ª within the cables 26 are connected to the rings 27 and 28, respectively.

In operation, the switch unit 24 is mounted on the annular surface 13 between the wheel rim 12 and the inner tube 11. A small hole 58 is drilled through the rim 12 to permit passage of the cable 25. Another small hole 59 is drilled to permit passage of the cable 26. When the pneumatic tire assembly 23 is inflated, pressure within the inner tube 11 serves to press the tube 11 against the resilient actuator 40. Increasing pressure serves first to separate the contacts 44 and 46, and subsequently to bring contacts 45 and 47 into engagement. By proper adjustment of the screws 48 and 51 before assembly on the rim 12, the movement of the switch member 43 by the actuator 40 can be made to correspond to the optimum range of pressure for the pneumatic tire assembly 23. For example, the screw 48 can be adjusted so that a unit pressure of 32 pounds per square inch, or less, within the inner tube 11 permits the resilience of the actuator 40 to hold contacts 44 and 46 in engagement. Similarly, the screw 51 may be adjusted so that the contacts 45 and 47 are brought into engagement when the unit pressure in the tube 11 reaches 37 pounds per square inch, or more. At intermediate values of unit pressure it will be apparent that neither pair of contacts is engaged.

In the wiring diagram of Figure 6, one of the movable switch elements has been designated 43 and the two contacts have been designated 45 and 46, corresponding to the mechanical arrangement of parts shown in the other figures. It will be observed that the movable switch element 43 is grounded at 60. A battery 61 or other source of electricity has one terminal grounded and the other terminal connected to one lead of each of two signal devices 62 and 63, which may comprise a red lamp and a green lamp, respectively. The other lead of each of these signal devices is connected to its respective contact 45, 46, via the disconnect switch 64. From this diagram it is apparent that when the movable switch member 43 is connected to the contact 46 the signal 63 is energized, whereas engagement between the switch 43 and the contact 45 serves to energize the signal 62. The disconnect switches 64, 65, 66 and 67 are mounted on the instrument panel of the vehicle along with the signal lamps 62 and 63, and each of these disconnect switches is preferably provided with an individual push-button for convenient operation. The disconnect switches 65, 66 and 67 are interposed between the pressure operated switches 68, 69 and 70, respectively, mounted on other wheels of the vehicle. Switches 64, 65, 66 and 67 are all normally closed, and automatically return to closed position after actuation. When one of the signal lamps 62 or 63 glows, the operator need only to open the disconnect switches in sequence to determine which tire is over-inflated or under-inflated, for when the correct disconnect switch is operated the glow is extinguished.

The metallic contacts 38 and 39 serve to provide a ground connection to the rim 12 and thus the return path of electricity from each of the signal devices is through the frame of the vehicle, through the bearing 18, wheel flange 14 and wheel rim 12.

The modification shown in Figure 2 is similar to the form of the invention just described, with the additional advantage that the pneumatic switch element may be adjusted without removing the tire from the wheel rim. This very desirable feature is accomplished by providing a circular well 71 at one point on the drop center portion 13ª of the wheel rim 12. A pneumatic switch unit 24ª having identical working parts to the switch unit 24 described above is shaped on its exterior surface to fit within the well 71. Apertures 72 and 73 are provided in the side walls of the well 71 in alignment with the access openings 50 and 53, respectively, (see Figure 5) and a clearance opening 74 may be provided in the wheel flange 75. A screwdriver may then be inserted through the apertures 72 or 73 to adjust the setting of either of the screws 48 or 51.

Having fully described my invention, it is to be understood that I do not wish to be limited to the details herein set forth, but my invention is of the full scope of the appended claims.

I claim:

1. In a device for indicating unit pressure existing within the inner tube of a wheel mounted pneumatic tire, the combination of a switch assembly adapted to be inserted between the wheel rim and the inner tube, said switch assembly having an electrically non-conductive body provided with a movable switch plunger, a first contact element fixed on the switch plunger, a second contact element adjustably mounted on the body in the path of movement of the first contact element, a resilient actuator overlying a portion of the body for engagement with the inner tube and connected to said switch plunger, the resilience of the actuator normally acting to move the switch plunger in one direction, and the pressure within the inner tube acting to oppose such movement.

2. In a device for indicating unit pressure existing within the inner tube of a pneumatic tire mounted on a wheeled vehicle, the combination of a switch assembly adapted to be inserted between the wheel rim and the inner tube, said switch assembly having an electrically non-conductive body provided with a conducting element for grounding against the wheel rim, a radially movable switch plunger extending into the body having a first contact element fixed thereon, a second contact element adjustably mounted on the body in the path of movement of the first contact element, a resilient metallic actuator overlying a portion of the body and positioned in contact with said conducting element, the switch plunger being connected to the actuator at a location between its ends, the resilience of the actuator normally acting to move the switch member in one direction, and the actuator presenting a substantial area for contact with the inner tube whereby the actuator and switch plunger are moved in the other direction by the unit pressure within the inner tube, and an insulated lead adapted to extend through an opening in the wheel rim and connected to the second contact element.

3. In a device for indicating unit pressure existing within the inner tube of a wheel mounted pneumatic tire, the combination of a switch assembly adapted to be inserted between the wheel rim and the inner tube, said switch assembly having an electrically non-conductive body provided with a movable switch member, a pair of stationary conducting elements mounted in the body on opposite sides of the movable switch member and adapted to engage the wheel rim to establish ground connections, a first contact element fixed on the switch member, a second contact element mounted on the body in the path of movement of the first contact element, a resilient metallic actuator overlying a portion of the body for engagement with the inner tube, the opposed ends of said actuator engaging said spaced conducting elements, the actuator being connected to the movable switch member and normally acting to resiliently urge the switch member in one direction and the pressure within the inner tube acting to oppose such movement, and an insulated electric lead adapted to extend through an opening in the wheel rim and connected to the said second contact element.

4. In a device for indicating unit pressure existing within the inner tube of a wheel mounted pneumatic tire, the combination of a switch assembly adapted to be inserted between the wheel rim and the inner tube, said switch assembly having an electrically non-conductive body provided with a movable switch member, a pair of contact elements fixed on the switch member, a corresponding pair of contact elements adjustably mounted on the body so that motion of the switch member in either direction is limited by cooperating engagement of the switch elements, a resilient actuator overlying a portion of the body for engagement with the inner tube, the resilience of the actuator normally serving to move the switch member in one direction and the pressure within the inner tube acting to oppose such movement.

5. In a device for indicating unit pressure existing within the inner tube of a wheel mounted pneumatic tire, the combination of a switch assembly adapted to be inserted between the wheel rim and the inner tube, said switch assembly having an electrically non-conductive body provided with a movable switch member, the upper portion of the body being rounded for contact with the inner tube, cooperating electric contact elements on the body and switch member, a recess in the upper rounded surface of the body, a resilient actuator adapted to be received within said recess to conform substantially to the rounded portion of the body, the resilience of the actuator normally acting to move the switch member in one direction and the pressure within the inner tube acting to oppose such movement.

6. In a device of the class described, a combination of an electrically non-conducting body having a substantially flat lower surface and a rounded upper surface, a pair of spaced metallic conducting elements mounted on the body and projecting through the lower surface, a movable switch member on the body positioned between said conducting elements, a resilient leaf spring shaped to conform substantially to the upper rounded surface of the body and contacting said conducting elements at each end thereof; the leaf spring being connected to the movable switch member and normally acting to move it in one direction, a contact element mounted on the body and having an eccentric portion adapted to limit movement of the switch member in one direction, and means for turning the contact element relative to the body for shifting the position of the eccentric portion and thereby change the extent of movement of the movable switch member.

7. In a device of the class described, a combination of an electrically non-conducting body having a substantially flat lower surface and a rounded upper surface, a pair of spaced metallic conducting elements mounted on the body and projecting through the lower surface, a movable switch member on the body positioned between said conducting elements, a resilient leaf spring shaped to conform substantially to the upper rounded surface of the body and contacting said conducting elements at each end thereof, the leaf spring being connected to the movable switch member and normally acting to move it in one direction, a pair of opposed contact elements mounted on the body and each having an eccentric portion adapted to limit movement of the switch member in one direction, means for turning either of the contact elements for changing the extent of travel of the switch member, and a pair of insulated leads each connected to one of said contact elements.

8. In a device for indicating unit pressure existing within the inner tube of a wheel mounted pneumatic tire, the combination of a switch assembly adapted to be inserted between the wheel rim and the inner tube, said switch assembly having an electrically non-conductive body provided with a movable switch member, a first contact element fixed on the switch member, a second contact element adjustably mounted on the body in the path of movement of the first contact element, a resilient actuator overlying a portion of the body for engagement with the inner tube, the resilience of the actuator normally acting to move the switch member in one direction, and the pressure within the inner tube acting to oppose such movement, and means accessible exteriorly of the wheel rim for adjusting the relative position of said contact elements.

9. In a device for indicating unit pressure existing within the inner tube of a wheel mounted pneumatic tire, the combination of a switch assembly adapted to be inserted between the wheel rim and the inner tube, said switch assembly having an electrically non-conductive body provided with a movable switch member, the upper portion of the body being rounded for contact with the inner tube, cooperating electric contact elements on the body and switch member, a recess in the upper rounded surface of the body, a pair of stationary conducting elements mounted in the body on opposite sides of the movable switch member and adapted to engage the wheel rim to establish ground connections, a resilient leaf spring shaped to conform substantially to the upper rounded surface of the body and adapted to be received within said recess, the opposed ends of said leaf spring engaging said spaced conducting elements, the resilience of the spring normally acting to move the switch member in one direction and the pressure within the inner tube acting to oppose such movement.

10. In a device for indicating unit pressure existing within the inner tube of a wheel mounted pneumatic tire, the combination of a switch assembly adapted to be mounted on the wheel rim adjacent the inner tube, said switch assembly having a non-resilient body provided with a rounded upper portion to contact the inner tube, a recess in the upper portion of the body, a bowed spring adapted to be received within said recess, the body having a central opening extending into the recess, a reciprocable switch member fixed to the spring between its ends and extending through the central opening into a cavity provided within the body, the resilience of the spring normally acting to move the switch member in one direction and the pressure within the inner tube acting to oppose such movement, and an electrical contact adjustably mounted within the body cavity and adapted to be engaged by said switch member at one end of its travel.

11. In a device for indicating unit pressure existing within the inner tube of a wheel mounted pneumatic tire, the combination of a switch assembly adapted to be mounted on the wheel rim adjacent the inner tube, said switch assembly having a non-resilient body provided with a rounded upper portion to contact the inner tube, a recess in the upper portion of the body, a bowed leaf spring shaped to conform substantially to the upper contact surface of the body and adapted to fill said recess to present a substantially flush surface to the inner tube, the body having a central opening extending into the recess, a reciprocable switch member fixed to the spring between its ends and slidably mounted in the central opening, the switch member extending into a cavity provided within the body, the resilience of the leaf spring normally acting to move the switch member in one direction and the pressure within the inner tube acting to oppose such movement, and an electrical contact adjustably mounted within the body cavity and adapted to be engaged by said switch member at one end of its travel.

12. In a device for indicating unit pressure existing within the inner tube of a wheel mounted pneumatic tire, the combination of a switch assembly adapted to be mounted on the wheel rim adjacent the inner tube, said switch assembly having a non-resilient body provided with a rounded upper portion to contact the inner tube, a recess in the upper portion of the body, a bowed leaf spring shaped to conform substantially to the upper contact surface of the body and adapted to fill said recess to present a substantially flush surface to the inner tube, the body having a central opening extending into the recess, a reciprocable switch member fixed to the spring between its ends and extending through the central opening into a cavity provided within the body, the resilience of the leaf spring normally acting to move the switch member upwardly and the pressure within the inner tube acting to oppose such movement, an electrical contact element adjustably mounted within the body cavity and adapted to be engaged by said switch member at the upper end of its travel, said contact being accessible for adjustment when the body is in operative position on said wheel rim.

13. In a device for indicating unit pressure existing within the inner tube of a wheel mounted pneumatic tire, the combination of a switch assembly adapted to be mounted on the wheel rim adjacent the inner tube, said switch assembly having a non-resilient body provided with a rounded upper portion to contact the inner tube, a recess in the upper portion of the body, a bowed leaf spring shaped to conform substantially to the upper contact surface of the body and adapted to be received within said recess, the body having a central opening extending into the recess, a reciprocable switch member fixed to the spring between its ends and extending through the central opening into a cavity provided within the body, the resilience of the leaf spring normally acting to move the switch member in one direction and the pressure within the inner tube acting to oppose such movement, high pressure and low pressure electrical contacts each adjustably mounted within the body cavity and adapted to be engaged by said switch member at opposite ends of its travel, said contacts being accessible for adjustment when the body is in operative position on said wheel rim.

14. In a device for indicating unit pressure existing within the inner tube of a wheel mounted pneumatic tire, the combination of a switch assembly adapted to be mounted on the wheel rim adjacent the inner tube, said switch assembly having a non-resilient body provided with a rounded upper portion to contact the inner tube, a recess in the upper portion of the body, a bowed leaf spring shaped to conform substantially to the upper contact surface of the body and adapted to be received within said recess, the body having a central opening extending into the recess, a reciprocable switch member fixed to the spring between its ends and slidably mounted in the central opening, the switch member extending into a cavity provided within the body, the resilience of the leaf spring normally acting to move the switch member in one direction and the pressure within the inner tube acting to oppose such movement, high pressure and low pressure electrical contacts each adjustably mounted within the body cavity and adapted to be engaged by said switch member at opposite ends of its travel, said contacts being accessible for adjustment when the body is in operative position on said wheel rim.

NORMAN A. DYSART.

REFERENCES CITED

The following references are of record in the file of this patent:

UNITED STATES PATENTS

| Number | Name | Date |
|---|---|---|
| 1,769,427 | Garside | July 1, 1930 |
| 1,800,196 | Bennett | Apr. 14, 1931 |
| 1,862,473 | Fitzgerald | June 7, 1932 |
| 1,928,193 | Wallin et al. | Sept. 26, 1933 |
| 2,135,303 | Greene | Nov. 1, 1938 |
| 2,249,426 | Jones et al. | July 15, 1941 |